Nov. 16, 1926.  1,606,965
G. SMITH
DISHWASHING MACHINE
Filed May 6, 1924  2 Sheets-Sheet 1
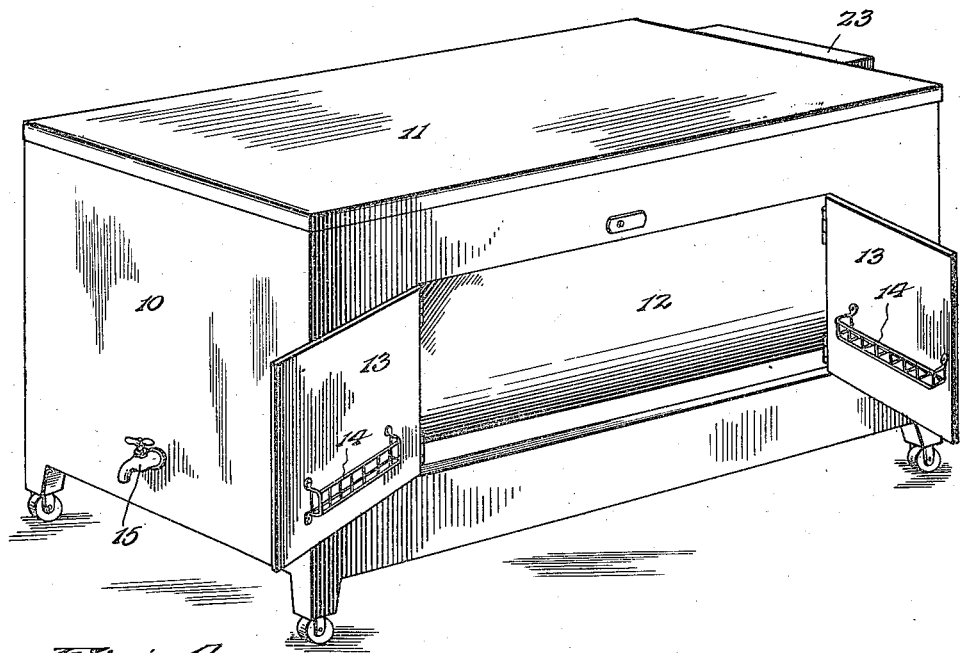
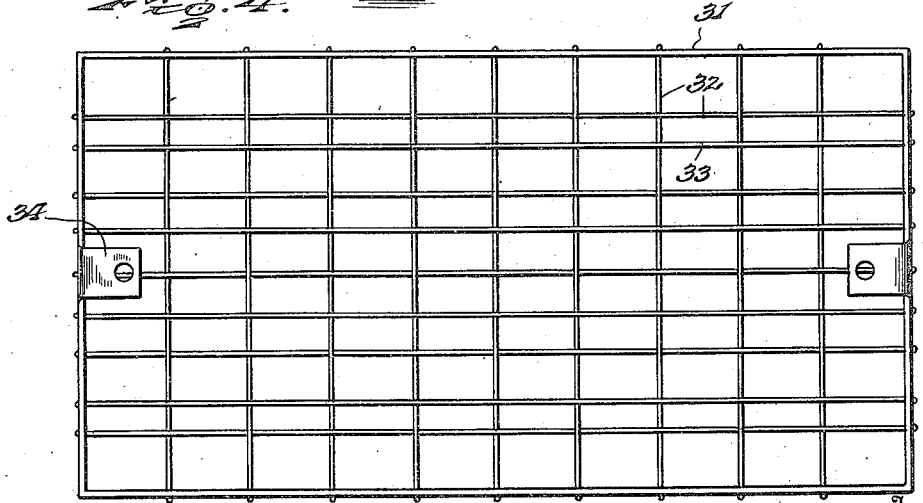
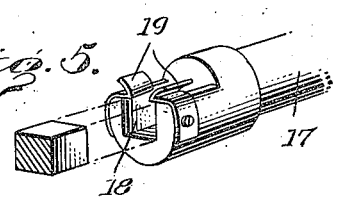
Inventor
George Smith.
By
Lacy & Lacy, Attorneys Inventor
George Smith.
By Lacy & Lacy, Attorneys Patented Nov. 16, 1926.

1,606,965

UNITED STATES PATENT OFFICE.

GEORGE SMITH, OF MULLEN, NEBRASKA.

DISHWASHING MACHINE.

Application filed May 6, 1924. Serial No. 711,431.

This invention relates to an improved dish washing machine and seeks, among other objects, to provide a device of this character adapted for family use and which will reduce the labor of washing dishes to a minimum.

The invention seeks, as a further object, to provide a device which will be simple in its operation and wherein, after the dishes have been placed in the tray of the device, it will be unnecessary to again handle the dishes in the washing or rinsing thereof.

And the invention seeks, as a still further object, to provide a device which may be readily cleaned and accordingly, may be easily kept in a thoroughly sanitary condition.

Other and incidental objects will appear hereinafter.

In the drawings:

Figure 1 is a perspective view of my improved dish washing machine.

Figure 4 is a detail plan view of the dish tray.

Figure 5 is an enlarged detail perspective view of the inner end of the drive shaft showing the socket for receiving the adjacent end of the dasher and the spring fingers for engaging and retaining the dasher in the socket.

Figure 2:
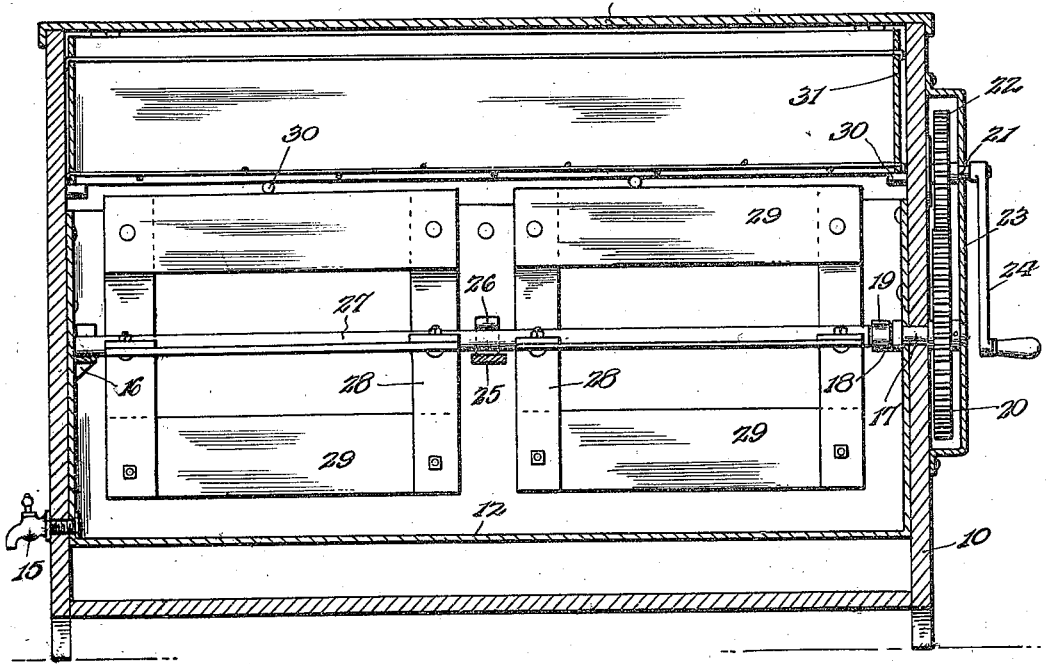
Figure 2 is a longitudinal sectional view taken medially through the device.

In carrying the invention into effect, I employ an oblong casing or cabinet 10 which may be of wood and closing the casing is a hinged cover 11 preferably of sheet metal. Fitting in the cabinet is a substantially semi-cylindrical tub or container 12 appropriately secured to the walls of the cabinet and, as will now be observed, the cabinet is provided at the front thereof with a pair of doors 13 so that articles may be stored in the cabinet beneath and at the front of the tub. Preferably, the doors are equipped with suitable racks 14 for receiving knives, pie pans, pot covers, or the like. The tub 12 may be of sheet metal but is preferably enameled so that the tub may be easily cleaned, and connected with one end of the tub is a drain cock 15.

Figure 3:
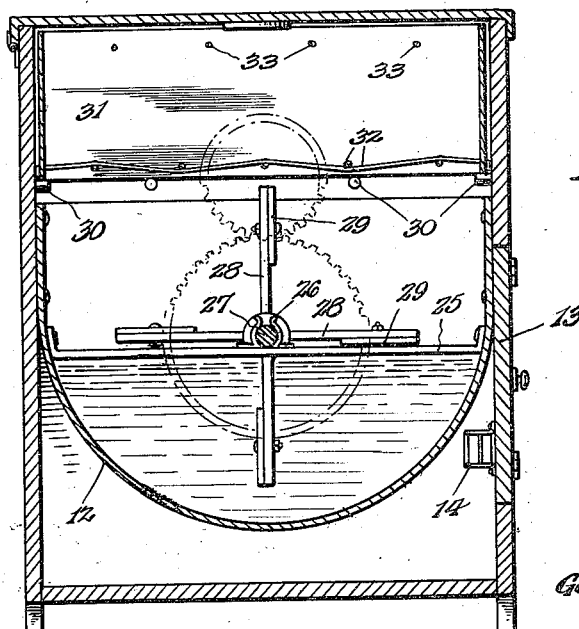
Figure 3 is a transverse sectional view.

Mounted upon one end wall of the tub is a bearing 16 open at its upper side and journaled through the opposite end wall of the tub and through the adjacent end wall of the cabinet 10 is a drive shaft 17 alining with said bearing. At its inner end, the drive shaft is formed with a squared socket 18 having spring fingers 19 and mounted upon the shaft at its outer end is a gear 20. Mounted above the shaft 17 is a power shaft 21 carrying a gear 22 meshing with the gear 20 and enclosing both gears is a gear casing 23. At its outer end, the shaft 21 is squared or otherwise formed to removably receive a hand crank 24. Extending transversely of the tub at a point substantially midway between the ends thereof is a cross bar 25 and mounted upon said bar is, as particularly shown in Figure 3 of the drawings, a pair of spring bearing clips 26 cooperating with each other to form a bearing alining with the bearing 16 and with the socket 18.

Removably received in the tub 12 is a dasher comprising a shaft 27 journaled at one end in the bearing 16 and squared at its opposite end to engage in the socket 18 to be removably gripped by the spring fingers 19 of said socket, while at a point medially thereof, the shaft is received between the spring clips 26 and is journaled in the bearing formed by said clips. Projecting from the shaft at opposite sides of the plane of the bar 25, are pairs of radial arms 28 and secured to the arms of each pair are paddles 29, two sets of paddles being thus provided. As will, of course, be clear in view of the foregoing, the hand crank 24 may be turned for rotating the dasher.

Projecting from the walls of the cabinet 10 above the upper edge of the tub 12 is a plurality of pegs 30 and resting upon said pegs is a dish tray 31 removably fitting in the upper end of the cabinet. As brought out in Figure 4, the tray is preferably formed with a bottom wall of crossed wires 32 and extending between the end walls of the tray near the upper edges thereof are appropriately spaced guide wires 33. Integrally formed on or otherwise secured to the end walls of the tray are inwardly overhanging handles 34 so that the tray may be readily removed from the cabinet when, of course, the dasher may be removed for cleaning of the device.

In use, the tub 12 is filled with water, when the dishes to be cleaned are placed within the tray 31 and, in this connection, it is to be noted that the guide wires 33 are so arranged that plates or the like may be placed between said wires to rest at their edges upon the bottom of the tray. Having arranged all of the dishes in the tray, the cover 11 is then closed when the hand crank 28 is operated for splashing or forcibly throwing the water over the dishes to effect the cleaning thereof. The tray may then be removed from the cabinet and the dishes rinsed or, by pouring water over the dishes, the rinsing operation may be accomplished without removing the tray from the cabinet when, if desired, the water may be drained from the tub and the dasher operated for fanning the dishes dry. It will accordingly be seen that I provide a particularly simple and efficient device for the purpose set forth while the invention is, at the same time, well adapted for general use.

Having thus described the invention, what I claim is:

A dish washing machine comprising a cabinet, a removable dish receiving tray in the upper portion of the cabinet, a semi-cylindrical tub suspended within the cabinet below the said tray and attached to the end and side walls thereof, a cross bar spanning the tub intermediate the ends thereof, a drive shaft journaled in an end of the cabinet and having a socket at its inner end, an upwardly opening bearing upon the inner side of the opposite end of the cabinet, a pair of spring bearing clips attached to the said cross bar, a dasher mounted in the said upwardly opening bearing, the bearing clips and the socket, and spring elements mounted on the socket of the drive shaft to hold the dasher in place.

In testimony whereof I affix my signature.

GEORGE SMITH. [L. S.]